United States Patent
Wilkes

(10) Patent No.: US 6,820,427 B2
(45) Date of Patent: Nov. 23, 2004

(54) METHOD AND APPARATUS FOR OPERATING A TURBINE ENGINE

(75) Inventor: Colin Wilkes, Delanson, NY (US)

(73) Assignee: General Electric Company, Schenectady, NY (US)

( * ) Notice: Subject to any disclaimer, the term of this patent is extended or adjusted under 35 U.S.C. 154(b) by 75 days.

(21) Appl. No.: 10/318,922

(22) Filed: Dec. 13, 2002

(65) Prior Publication Data
US 2004/0112059 A1 Jun. 17, 2004

(51) Int. Cl.[7] .................................................. F02C 3/22
(52) U.S. Cl. ..................................... 60/772; 60/39.465
(58) Field of Search .............................. 60/39.465, 772, 60/734, 736

(56) References Cited

U.S. PATENT DOCUMENTS

| | | | |
|---|---|---|---|
| 5,251,432 A | 10/1993 | Bruckner et al. | |
| 5,340,274 A | 8/1994 | Cunha | |
| 5,412,936 A | 5/1995 | Lee et al. | |
| 5,609,016 A | * | 3/1997 | Yamada et al. ......... 60/39.465 |
| 6,298,652 B1 | * | 10/2001 | Mittricker et al. ............ 60/780 |
| 6,357,218 B1 | 3/2002 | Ranasinghe et al. | |
| 6,502,402 B1 | * | 1/2003 | Smith et al. ................. 60/775 |

FOREIGN PATENT DOCUMENTS

JP  57-83637  *  5/1982

* cited by examiner

Primary Examiner—Louis J. Casaregola
(74) Attorney, Agent, or Firm—William Scott Andes; Armstrong Teasdale LLP

(57) ABSTRACT

A method for operating a turbine is provided. The method includes supplying working fluid to a first flow path input and routing the fluid through a heating unit coupled in flow communication to the flow path between first flow path input and the turbine. The method also includes extracting a portion of the working fluid from first flow path at a point intermediate the heating unit and an inlet of the turbine. The method further includes re-circulating the extracted fluid through a second flow path such that the extracted fluid is discharged upstream from the heating unit.

15 Claims, 3 Drawing Sheets

METHOD AND APPARATUS FOR OPERATING A TURBINE ENGINE

BACKGROUND OF THE INVENTION

This invention relates generally to turbine engines, and more specifically to methods and apparatus for operating turbine engines.

At least some known turbine engines include a plurality of rotor blades that extract rotational energy from fluid flow entering the turbine and a gas fuel cleanup system that heats the fluid entering the turbine. More specifically, at least some known gas fuel cleanup systems include a coalescing filter and a gas fuel superheater. The gas fuel heaters may heat fluid channeled to a plurality of gas turbines. However, during a plant outage, the temperature of the gas may approach the ambient air temperature if the gas pipe is routed above ground or may approach the ground temperature if routed below grade level. As a result, during a turbine restart, any gas fuel trapped between the heater and the gas turbine may not be at a sufficient operating temperature to prevent condensate formation.

To facilitate maintaining the operating temperature of the gas fuel, at least some known systems use an auxiliary startup coalescing filter and an auxiliary electric startup heater. However, installation of auxiliary startup filters and heaters may be costly and may be limited by space considerations. In addition, if an auxiliary startup filter and/or an auxiliary heater fail, the temperature of the working fluid may fall below the required superheat value that will prevent condensation during expansion through the gas control valves.

BRIEF DESCRIPTION OF THE INVENTION

In one aspect, a method for operating a turbine is provided. The method includes supplying working fluid to a first flow path input and routing the fluid through a heating unit coupled in flow communication to the flow path between first flow path input and the turbine. The method also includes extracting a portion of the working fluid from first flow path at a point intermediate the heating unit and an inlet of the turbine. The method further includes re-circulating the extracted fluid through a second flow path such that the extracted fluid is discharged upstream from the heating unit.

In another aspect, a fluid delivery system for a turbine is provided. The fluid delivery system includes a first flow path for supplying working fluid to the turbine. The first flow path includes an input end and an output end, wherein the output end is coupled to the turbine. The fluid delivery system also includes a heating unit coupled in flow communication within the first flow path for heating the working fluid. The fluid delivery system further includes a second flow path comprising a first end and a second end. The first end is coupled in flow communication to the first flow path between the heating unit and the turbine for extracting a portion of the working fluid from the first flow path. The second end is coupled in flow communication to the first flow path between the first flow path input end and the heating unit such that a portion of the working fluid is re-circulated through the second flow path.

In a further aspect, a turbine is provided. The turbine includes an inlet, and a first flow path for supplying working fluid to the turbine. The first flow path includes an input end and an output end, wherein the output end is coupled to the turbine inlet. The turbine also includes a heating unit coupled between the first flow path input and output ends for heating the working fluid. The turbine further includes a second flow path including a first end and a second end, the second end flow path first end is coupled in flow communication to the first flow path between the heating unit and the turbine inlet for extracting a portion of the working fluid from the first flow path. The second flow path second end is coupled in flow communication with the second flow path between the first flow path inlet end and the heating unit.

DETAILED DESCRIPTION OF THE INVENTION

Figure 1:
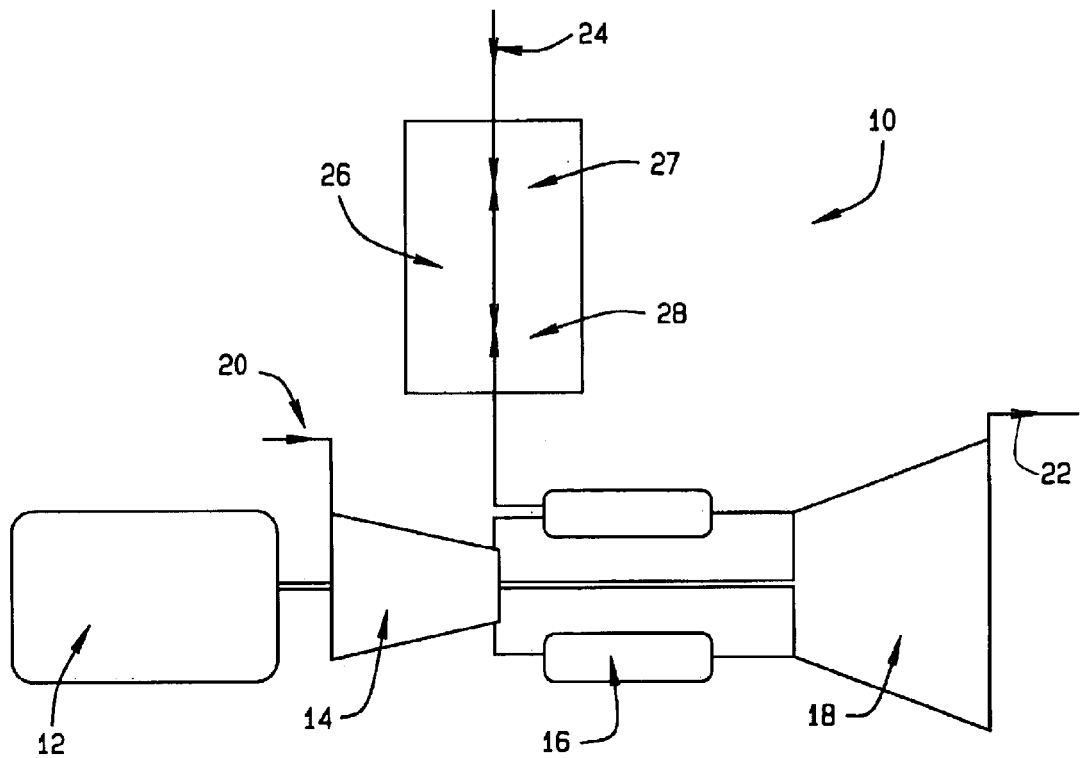
FIG. 1 is a schematic illustration of a gas turbine engine including multiple combustors.

FIG. 1 is a schematic illustration of a gas turbine engine 10 including a generator 12, a compressor 14, a combustor 16 and a turbine 18. Engine 10 has an inlet or upstream side 20, an exhaust or downstream side 22, and a gas fuel inlet 24. The gas fuel passes through a gas control module 26 containing an isolation valve 27, known as the stop-ratio valve (SRV) and a gas control valve (GCV) 28. For some applications, such as dry low $NO_x$ combustion, multiple GCV's are required and are arranged in parallel to GCV 28. In one embodiment, engine 10 is a turbine engine commercially available from General Electric Power Systems, Schenectady, N.Y.

In operation, highly compressed air is delivered from compressor 14 to combustor 16. Gas fuel is delivered to the combustor 16 through a plurality of fuel nozzles (not shown in FIG. 1) and hot exhaust gas from combustor 16 is discharged through a turbine nozzle assembly (not shown in FIG. 1) and is used to drive turbine 18. Turbine 18, in turn, drives compressor 14 and generator 12.

Figure 2:
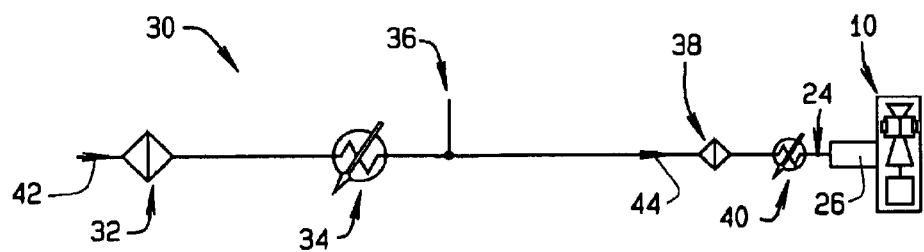
FIG. 2 is a schematic of a known gas fuel superheating system for a single turbine.

FIG. 2 shows a schematic of a known gas fuel superheating system 30 including a coalescing filter 32 to facilitate removing liquids, a primary gas fuel superheater 34, a temperature sensor 36, a startup coalescing filter 38, and a startup gas fuel superheater 40. Gas fuel is channeled from an input end 42 along a first flow path 44 to an output end or gas fuel inlet 24 coupled to an inlet or gas control module 26 of turbine 10. Primary gas fuel superheater 34 is a natural gas-fired water bath that raises a temperature of the gas at the design full flow rate. During a power outage, gas remaining in the section of pipe between primary gas fuel superheater 34 and gas turbine 10 may decrease in temperature and if the temperature is decreased below the hydrocarbon and/or moisture dew point, condensates may form.

To satisfy the gas fuel specification GEI 41040 G (or other gas turbine manufacturer's specification requiring superheat), startup heater 40 is activated prior to starting gas turbine 10. Gas fuel is routed through startup gas fuel superheater 40, which is coupled in flow communication to first flow path 44 between input end 42 and inlet 26 of turbine 10. In addition, gas fuel is routed through a startup coalescing filter 38, which is coupled in flow communication to first flow path 44 between input end 42 and startup gas fuel superheater 40. Startup coalescing filter 38 facilitates removing condensates formed in the trapped gas before the gas is superheated as it passes through startup heater 40. Although FIG. 2 is shown for use with only one turbine, a single coalescing filter 32 and primary gas fuel superheater 34 may provide heated gas to multiple turbines where each turbine has its own startup coalescing filter 38, and startup gas fuel superheater 40. Various other arrangements may also be used including dual parallel filters with isolation valves (not shown in FIG. 2) that permit on-line maintenance to be performed.

Figure 3:
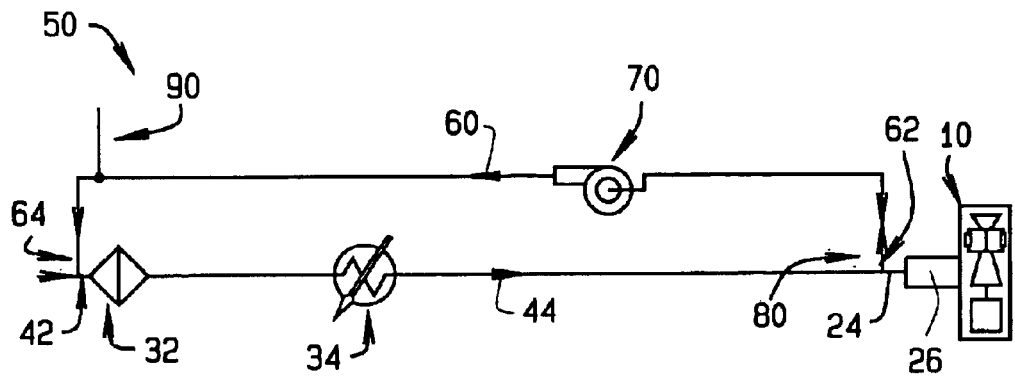
FIG. 3 is an exemplary schematic of a gas fuel re-circulating system for a single turbine.

FIG. 3 is an exemplary schematic of a gas fuel re-circulating system 50 for maintaining gas fuel operating temperature for turbine 10. Gas fuel re-circulating system 50 includes first flow path 44 for supplying working fluid or gas fuel to inlet 26 of turbine 10. First flow path 44 has an input end 42, primary coalescing filter 32, primary gas fuel superheater 34, and output end 24 coupled to inlet 26 of turbine 10. A second flow path 60 has a first end 62 and a second end 64. First end 62 is coupled in flow communication to first flow path 44 between primary gas fuel superheater 34 and turbine 10 for extracting a portion of the gas fuel from first flow path 44. Second end 64 is coupled in flow communication to first flow path 44 between first flow path input end 42 and primary gas fuel superheater 34 such that a portion of the gas fuel is re-circulated through second flow path 60.

A portion of the gas fuel is extracted from first flow path 44 at a point intermediate primary heater 34 and inlet 26. A second flow path 60 re-circulates the extracted gas fuel such that the extracted gas fuel is discharged upstream from primary heater 34. In one embodiment second flow path 60 re-circulates the gas fuel back to input end 42 of first flow path 44. Second flow path 60 eliminates the need for startup coalescing filter 38 and heater 40, as shown in FIG. 1. In addition, system 50 can be optimized by adjusting the second flow path 60 pipe diameter to minimize overall cost for a given site configuration and ambient conditions.

In the exemplary embodiment, a small fan or blower 70 is utilized in second flow path 60 to provide the required pressure differential to overcome the pressure drop across primary heater 34, primary coalescing filter 32 and frictional losses in the piping to promote the re-circulation flow. In one embodiment, blower 70 is a centrifugal or axial flow fan. In a gas atmosphere, electrical motors (not shown) must be sealed in order to be isolated from the gas to avoid explosive hazards.

Prior to start up, primary gas fuel heater 34 is activated and enough energy is provided to heat the re-circulating gas above the required superheat. The energy input required will be much less than the design point for startup heater 40 as the re-circulating gas flow rate in second flow path 60 is less than the gas flow rate in first flow path 44 during the start up sequence. Following a plant shut down or power outage, primary heater 34 is reduced to meet the temperature requirements for the re-circulating gas flow rate in second flow path 60.

In one embodiment, an isolation valve 80 is utilized to restrict the flow of a fluid (gas in this case) to certain sections of the piping. Isolation valve 80 can be manually operated or remotely controlled via an actuator (not shown). Isolation valve 80 prevents gas from flowing from a gas fuel source to turbine 10 through second flow path 60 during normal operation after the blower 70 is turned off. The pressure drop across coalescing filter 32 and primary heater 34 would drive a small quantity of gas through second flow path 60 that would by-pass primary filter 32 and primary heater 34. During an outage when gas does not flow to the turbine 10, isolation valve 80 is opened allowing a small quantity of gas to flow through blower 70 and return to coalescing filter 32 via second flow path 60. In another embodiment, a temperature sensor 90 is positioned between blower 70 and input end 42.

Figure 4:
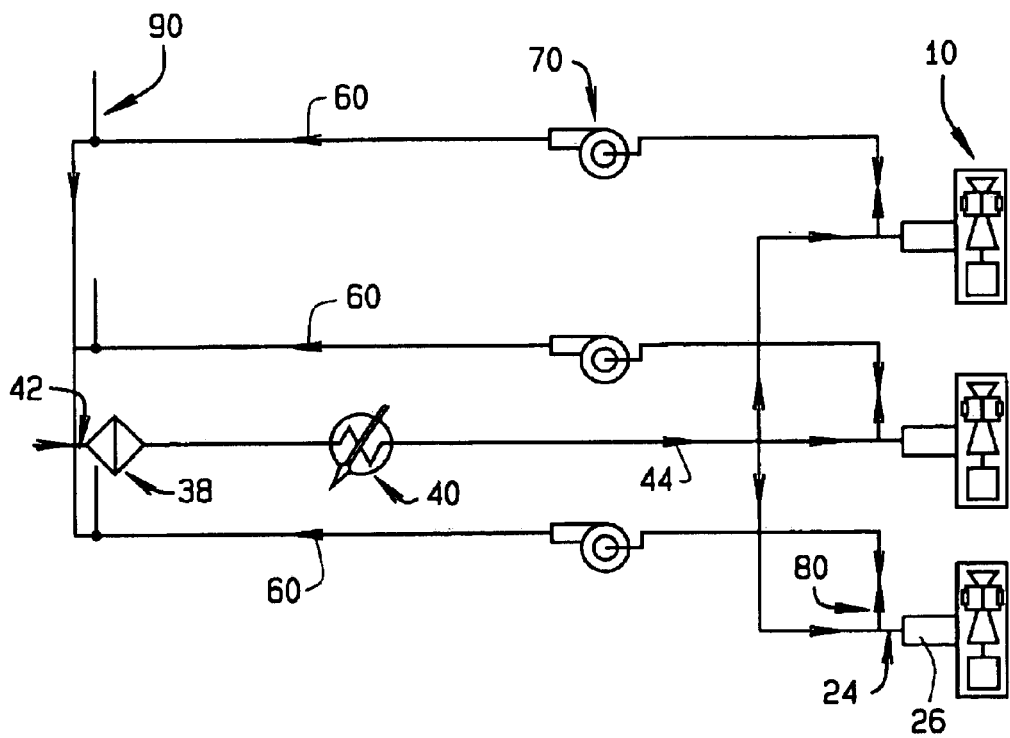
FIG. 4 is a schematic of a gas fuel re-circulating system for multiple turbines.

FIG. 4 is a schematic of one embodiment of a gas fuel re-circulating system for maintaining gas fuel superheat for multiple gas turbines. Although the schematic shows only one primary coalescing filter, base loaded plants may include two parallel filters and isolation valves so that one filter can be taken out of service for maintenance without requiring an outage. The cost savings realized by installing this system will depend on the required equipment redundancy.

Figure 5:
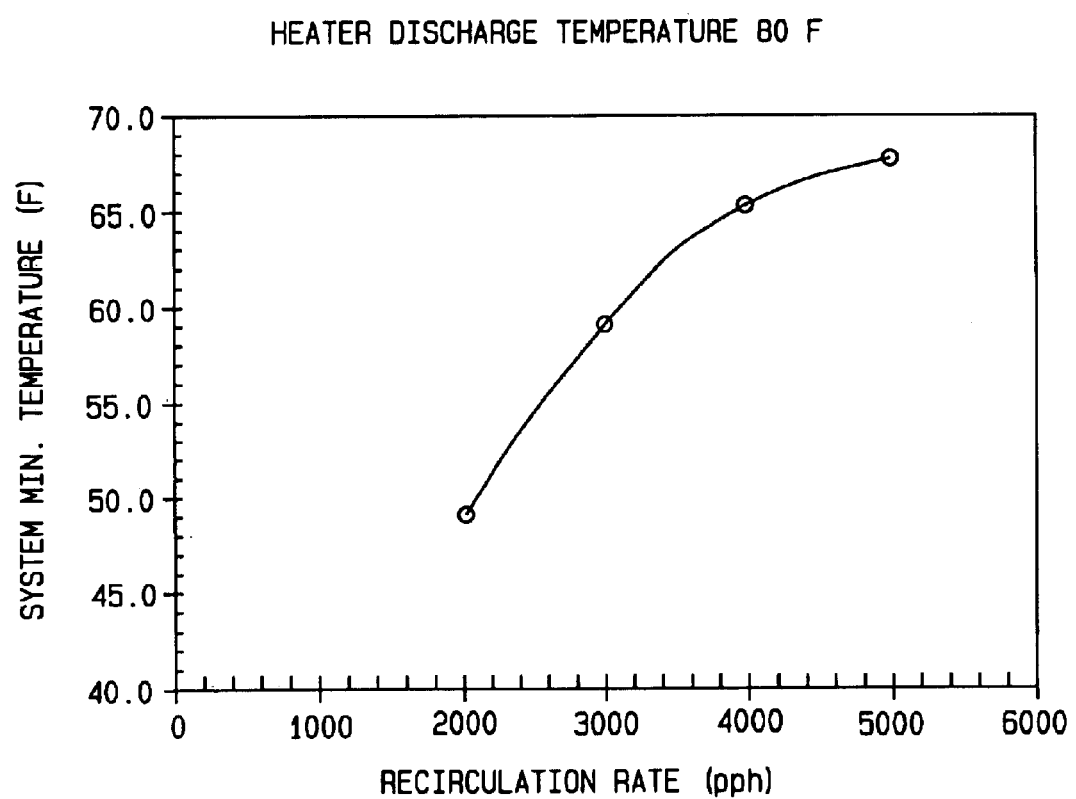
FIG. 5 shows the relationship between the re-circulation rate and the minimum temperature.

FIG. 5 describes the relationship between the second flow path rate and the minimum temperature. An appropriate control algorithm can be used to maintain the required system minimum gas temperature. More specifically, because blower speed is proportional to the second flow path rate, an algorithm of the form shown below can be used.

$$N_{op} = N_{set} \times (1 + A \times T_{err}/T_{set}) \quad (1)$$

$$N_{set} = SQRT(B + C \times T_{set} + D \times T_{set}^2) \quad (2)$$

Combining equations (1) and (2), $$N_{op} = SQRT((B + C \times T_{set} + D \times T_{set}^2) \times (1 + A \times T_{error}/T_{set})) \quad (3)$$

Wherein:

A, B, C and D are constants determined by modeling of the installation configuration and adjusted by experimental testing.

$N_{op}$ is the feedback-corrected operating speed of the blower required to maintain the required operating temperature $T_{set}$.

$N_{set}$ is the design operating speed of the blower, r.p.m.

$T_{set}$ is the desired operating temperature, degrees F.

$T_{error}$ is the temperature error $T_{meas} - T_{set}$, degrees F.

$T_{meas}$ is the measured temperature, degrees F.

Equation (3) represents a typical form of an algorithm that can be used to correct the blower operating speed using the feedback signal of the gas temperature $T_{meas}$. The initial value of the constant A is 1 but can be adjusted to match the installation configuration and permit stable operation without overestimating or underestimating the desired temperature $T_{set}$.

The above-described gas fuel re-circulating system is a cost-effective and highly reliable means for maintaining the gas between the main heater and the gas turbine in a superheated state and delivering the gas to the turbine without the need for a startup heater. The gas fuel re-circulating system does not allow condensates to form in the exposed pipe. With current systems, condensates may form, are then are separated and the remaining gas phase is superheated by the start up heater. This presents the risks that the coalescing filter will allow carry over liquids due to saturation of the filter or the possibility that the filter has failed due to inadequate maintenance. By preventing the formation of condensates, these risks are eliminated. In addition, the gas fuel re-circulating system eliminates the need for a startup filter and heater. As a result, the gas fuel re-circulating system facilitates maintaining gas in a superheated state during a power outage in a cost-effective and reliable manner.

Exemplary embodiments of gas fuel re-circulating systems are described above in detail. The systems are not limited to the specific embodiments described herein, but rather, components of each gas fuel re-circulating systems may be utilized independently and separately from other components described herein. Each gas fuel re-circulating system component can also be used in combination with gas fuel re-circulating systems and turbine components.

While the invention has been described in terms of various specific embodiments, those skilled in the art will recognize that the invention can be practiced with modification within the spirit and scope of the claims.

What is claimed is:

1. A method for operating a turbine, said method comprising:

supplying working fluid to a first flow path input of the turbine;

routing the fluid through a heating unit coupled in flow communication to the flow path between first flow path input and the turbine;

extracting a portion of the working fluid from first flow path at a point intermediate the heating unit and an inlet of the turbine; and re-circulating the extracted fluid through a second flow path using a blower such that the extracted fluid is discharged upstream from the heating unit.

2. A method according to claim 1 further comprises routing the fluid through a coalescing filter coupled in flow communication to the flow path between first flow path input and the heating unit.

3. A method according claim 1 wherein said routing the fluid through a heating unit further comprises routing the fluid through heating unit configured to be a gas fuel superheater.

4. A method according to claim 1 wherein said extracting a portion of the working fluid further comprises re-circulating the extracted fluid through an isolation valve.

5. A method for operating a turbine, said method comprising:

supplying a fluid to a first slow path input of the turbine;

routing the fluid through a heating unit coupled in flow communities to the flow path between first flow path input and the turbine;

extracting a portion of the working fluid from first flow path at a point intermediate the heating unit and an inlet of the turbine;

re-circulating the extracted fluid through a second flow path such that the extracted fluid is discharged upstream from the heating unit; and measuring the temperature of the extracted fluid in the second flow path.

6. A fluid delivery system for a turbine, said system comprising:

a first flow path for supplying working fluid to the turbine, said first flow path comprising an input end and an output end, said output end coupled to said turbine;

a heating unit coupled in flow communication within said first flow path for heating the working fluid;

a second flow path comprising a first end and a second end, said first end coupled in fluid communication to said first flow path between said heating unit and said turbine for extracting a portion of the working fluid from said first flow path, said second end coupled in flow communication to said first flow path between said first flow path input end and said heating unit such that a portion of the working fluid is re-circulated through the second flow path; and a blower coupled to said second flow path.

7. A fluid delivery system according to claim 6 further comprising a coalescing filter between said first flow path input end and heating unit.

8. A fluid delivery system according to claim 6 wherein said heating unit comprises a gas fuel superheater.

9. A fluid delivery system according to claim 6 further comprising an isolation valve coupled between said first flow path first end and said second flow path first end.

10. A fluid delivery system for a turbine, said system comprising:

a first flow path for supplying working fluid to the turbine, said first flow path comprising an input end and an output end, said output end coupled to said turbine;

a heating unit coupled in flow communication within said first flow path for heating the working fluid;

a second flow path comprising a first end and a second end, said first end coupled in fluid communication to said first flow path between said heating unit and said turbine for extracting a portion of the working fluid from said first flow path, said second end coupled in flow communication to said first flow path between said first flow path input end and said heating unit such that a portion of the working fluid is re-circulated through the second flow path; and a temperature sensor positioned between said second flow path first and second ends.

11. A turbine comprising:

an inlet;

a first flow path for supplying working fluid to said turbine, said first flow path comprising an input end and an output end, said output end coupled to said turbine inlet;

a heating unit coupled between said first flow path input and output ends for heating the working fluid;

a second flow path comprising a first end and a second end, said second end flow path first end coupled in fluid communication to said first flow path between said heating unit and said turbine inlet for extracting a portion of the working fluid from said first flow path, said second flow path second end coupled in fluid communication with said second flow path between said first flow path inlet end and said heating unit; and a blower coupled to said second flow path.

12. A turbine according to claim 11 further comprising a coalescing filter coupled between said first flow path input end and heating unit.

13. A turbine according to claim 11 wherein said heating unit comprises a gas fuel superheater.

14. A turbine according to claim 11 further comprising an isolation valve coupled between said second flow path first and second ends.

15. A turbine comprising an inlet;

a first flow path for supplying working to said turbine, said first flow path comprising an input end an output end, said output end coupled to said turbine inlet;

a heating unit coupled between said first flow path input and output ends for heating the working fluid;

a second flow path comprising a first end and a second end, said second end flow path first end coupled in fluid communication to said first flow path between said heating unit and said turbine inlet for extracting a portion of the working fluid from flow path, said second flow path second end coupled in fluid communication with said second flow path between said first flow path inlet end and said heating unit; and a temperature sensor positioned between said second flow path first and second ends.

* * * * *

UNITED STATES PATENT AND TRADEMARK OFFICE
CERTIFICATE OF CORRECTION

PATENT NO. : 6,820,427 B2
DATED : November 23, 2004
INVENTOR(S) : Wilkes

It is certified that error appears in the above-identified patent and that said Letters Patent is hereby corrected as shown below:

Column 5,
Line 41, delete "supplying a" and insert -- supplying working --.
Line 41, delete "slow path" and insert -- flow path --.
Line 43, delete "communities" and insert -- communication --.

Column 6,
Line 59, after "working" insert -- fluid --.
Line 60, after "input end" insert -- and --.

Column 7,
Line 1, after "from" insert -- said first --.

Signed and Sealed this

Twenty-third Day of May, 2006

JON W. DUDAS
*Director of the United States Patent and Trademark Office*